US012068118B2

(12) United States Patent
Chyla

(10) Patent No.: US 12,068,118 B2
(45) Date of Patent: Aug. 20, 2024

(54) VACUUM CIRCUIT BREAKER WITH WELDABLE COPPER SWITCH CONTACTS

(71) Applicant: Siemens Energy Global GmbH & Co. KG, Munich (DE)

(72) Inventor: Thomas Chyla, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 168 days.

(21) Appl. No.: 17/786,696

(22) PCT Filed: Nov. 17, 2020

(86) PCT No.: PCT/EP2020/082400
§ 371 (c)(1),
(2) Date: Jun. 17, 2022

(87) PCT Pub. No.: WO2021/121832
PCT Pub. Date: Jun. 24, 2021

(65) Prior Publication Data

US 2023/0017027 A1 Jan. 19, 2023

(30) Foreign Application Priority Data

Dec. 17, 2019 (DE) ..................... 10 2019 219 879.1

(51) Int. Cl.
*H01H 1/02* (2006.01)
*H01H 11/04* (2006.01)
*H01H 33/664* (2006.01)

(52) U.S. Cl.
CPC .............. *H01H 11/04* (2013.01); *H01H 1/02* (2013.01); *H01H 33/664* (2013.01)

(58) Field of Classification Search
CPC ........ H01H 11/04; H01H 11/048; H01H 1/02; H01H 1/0203; H01H 2001/0205;
(Continued)

(56) References Cited

U.S. PATENT DOCUMENTS 6,071,389 A * 6/2000 Zhang .................. B23K 20/021 419/48
6,172,317 B1 1/2001 Wristen
(Continued)

FOREIGN PATENT DOCUMENTS

DE 3347550 A1 7/1985
DE 102013204775 A1 9/2014
(Continued)

*Primary Examiner* — William A Bolton
(74) *Attorney, Agent, or Firm* — Laurence A. Greenberg; Werner H. Stemer; Ralph E. Locher

(57) ABSTRACT

A method for producing an electrical switch contact arrangement for a vacuum circuit breaker includes the following steps: a) providing two electrical contact pieces made of copper or a copper alloy; b) coating the electrical contact pieces with aluminum or an aluminum alloy, the coating of the contact pieces taking place by means of a cold gas spraying method; c) welding each of the sides coated in method step b) to a current transfer contact; and d) arranging the units obtained in method step b) inside the vacuum circuit breaker. There is also described an electrical switch contact arrangement for a vacuum circuit breaker with the contact pieces produced by the method according to the invention.

10 Claims, 3 Drawing Sheets

(58) Field of Classification Search
CPC .. H01H 33/664; H01H 33/6606; C23C 24/04; C23C 28/345
USPC .................................. 218/118, 123, 130, 132
See application file for complete search history.

(56) References Cited

U.S. PATENT DOCUMENTS

| | | | | |
|---|---|---|---|---|
| 6,753,494 | B2 * | 6/2004 | Asakawa | H01H 33/664 218/130 |
| 7,662,208 | B2 * | 2/2010 | Kikuchi | H01H 1/0233 218/123 |
| 7,758,917 | B2 | 7/2010 | Gentsch et al. | |
| 7,820,934 | B2 * | 10/2010 | Cardoletti | H01H 33/66261 218/123 |
| 8,002,595 | B2 * | 8/2011 | Kobayashi | C22C 5/06 439/931 |
| 8,497,445 | B2 * | 7/2013 | Yoshida | H01H 33/66207 218/118 |
| 8,845,956 | B2 * | 9/2014 | Gentsch | B22F 3/1283 419/48 |
| 9,666,382 | B2 * | 5/2017 | Kuroda | C22C 5/10 |
| 10,446,336 | B2 | 10/2019 | Ajdelsztajn et al. | |
| 2014/0272459 | A1 * | 9/2014 | Daugherty | C23C 28/345 438/758 |
| 2016/0045969 | A1 | 2/2016 | Graskowski et al. | |

FOREIGN PATENT DOCUMENTS

| | | | |
|---|---|---|---|
| DE | 102017129388 | A1 | 6/2018 |
| EP | 0203367 | A1 | 12/1986 |
| EP | 0521274 | A1 | 1/1993 |
| EP | 1831903 | B1 | 4/2008 |
| GB | 1214697 | A | 12/1970 |
| WO | WO 2006032522 | A1 | 3/2006 |

* cited by examiner

VACUUM CIRCUIT BREAKER WITH WELDABLE COPPER SWITCH CONTACTS

FIELD AND BACKGROUND OF THE INVENTION

The present invention relates to a method for producing an electrical switching contact arrangement for a vacuum circuit breaker, the method comprising at least the following steps: a) providing two electrical contact pieces made of copper or a copper alloy; b) coating the electrical contact pieces with aluminum or an aluminum alloy, the coating of the contact pieces taking place by means of a cold gas spraying method; c) welding each of the sides coated in method step b) to a current transfer contact; and d) arranging the units obtained in method step b) inside the vacuum circuit breaker. The invention furthermore relates to an electrical switching contact arrangement for a vacuum circuit breaker having the contact pieces produced according to the method according to the invention.

The safe and low-maintenance control of high currents or high voltages are now more important since the distances between the location of the generation and the location of the consumption of the electrical energy are becoming ever greater in the course of the energy revolution. As a result, ever greater amounts of electricity are conducted via the existing infrastructure which has a particularly significant effect on the susceptibility of the entire system to faults. In order to do justice to this situation, safer and more low-maintenance individual components are a prerequisite.

Vacuum circuit breakers for switching medium and high voltages have already been prior art for a long time. This design is robust and has been proven in particular for accommodating high currents. In contrast, however, it is disadvantageous that only particular materials are suitable for the switching contacts due to the accommodation of high switch-off currents and the associated high forces of the arc plasma that arises. These constructional boundary conditions result in an only very restricted material selection and accordingly only restricted production options for these components located on the direct switching path of the current. Therefore, for example, the contact bolts of a vacuum switching tube are preferably manufactured from copper or copper alloys due to the thermal and electrical properties, the contact bolts then being able to be connected mechanically in only a very restricted manner to further components of the vacuum circuit breaker via screwing or clamping. These purely mechanical fastening options may be inconvenient and susceptible to faults.

The patent literature also deals with different approaches to improving the design of the electrical contacts of vacuum circuit breakers.

For example, EP 0 203 367 A1 thus describes a contact arrangement for vacuum switches, with two contacts arranged coaxially with respect to one another and displaceable relative to one another in their axial direction, said contacts each comprising a disc-shaped contact piece with a contact surface and a disc, at a distance behind it, made from a material that is a good electrical conductor, said discs each being directly connected to the central current supplying bolt and by virtue of being constructed with circular recesses and slots producing radially and azimuthally extending current conductors and hence means for generating axial magnetic fields, the current passing from the current supplying bolt to the contact piece via the current conductors of the disc to the contact piece, characterized by the following features: a) the slots proceed from the circumference of the disc tangentially to the circular recesses, b) slots for current conduction between the disc and the contact piece are delimited in each case by the slots and the recesses, c) the opposing contacts are oriented azimuthally in such a way that the circular recesses of the two opposing discs are congruent in the axial direction but the associated tangential slots only oppose one another on the outer diameter of the discs.

DE 3 347 550 A1 furthermore discloses a chromium and copper composite material intended, in particular, for electrical contact pieces in vacuum switches for medium to high voltages in power engineering, wherein the material comprises a chromium structure impregnated with copper or copper alloys, wherein the material contains carbon, partly in the form of free graphite and partly in bound metal-carbide form, for which purpose the chromium structure additionally contains one or more of the metals nickel, cobalt or iron in an amount of 0.05 to 2% by mass.

EP 1 831 903 B1 discloses a vacuum switching chamber having a first and a second contact piece for switching an electric current flowing through the vacuum chamber in the closed state and having at least one heat tube containing a working fluid to remove heat arising from the electric current in the vacuum chamber, wherein the heat tube comprises one section denoted as evaporator and one section of the tube denoted as condenser, with the heat tube having a flexibly deformable section.

However, such solutions known from the prior art for improving the electrical and mechanical properties of the electrical contacts of vacuum circuit breakers can provide further improvement potential, in particular with respect to the mechanical and electrical connection of the contact pieces to the other components of the vacuum switching chamber.

SUMMARY OF THE INVENTION

It is the object of the present invention to at least partly overcome the disadvantages known from the prior art. It is in particular the object of the present invention to provide a solution which is distinguished by a particularly advantageous mechanical and electrical connection of the electrical contact pieces to the rest of the structure of a vacuum switching chamber.

The object is achieved according to the invention at least in part by a method having the features as claimed and by an electrical contact arrangement having the features as claimed.

The present invention thus relates to a method for producing an electrical switching contact arrangement for a vacuum circuit breaker comprising two electrical contact pieces which can be contact-connected to one another, wherein the method comprises at least the following steps:

a) providing two electrical contact pieces made of copper or a copper alloy;

b) coating in each case at least one side of the electrical contact pieces with aluminum or an aluminum alloy, the coating of the contact pieces taking place by means of a cold gas spraying method and at least one coated side being located opposite the contact side of the two contact pieces;

c) welding each of the sides of the contact pieces coated with aluminum in method step b) to a current transfer contact;

d) arranging the units consisting of contact piece and current transfer contact obtained in method step b) inside the vacuum circuit breaker.

It has surprisingly been found that a mechanical connection of the contact pieces to the other components of vacuum switching chambers via a layer of cold-gas-sprayed aluminum leads to vacuum switching chambers with a particularly long life and low need for maintenance. The clamping or screwing processes known previously from the prior art are thus superfluous and contact points between the contact piece and current collector which are more electrically homogeneous due to the connection via welding are produced. In the configuration according to the invention, high voltages or high currents are dissipated by means of a homogeneous connection of the contact piece to the current collector such that the electrical and magnetic fields that arise can be diverted homogenously. This is more difficult in the configurations known from the prior art in which the contact pieces are not connected to the current collectors symmetrically. As a result, a preferential direction in the diversion of the currents may always result, which may lead to increased wear of particular areas of the contact piece. Another advantage is that the cold-gas-sprayed aluminum layer is very thick so that the vacuum of the vacuum switching tube can be guaranteed over long down times even during operation. The connection of the contact piece to the current collector via welding is able to be loaded mechanically to a great extent, such that the failsafe down times of the vacuum switching tube can be extended.

The method according to the invention is a method for producing an electrical switching contact arrangement for a vacuum circuit breaker comprising two electrical contact pieces which can be contact-connected to one another. Vacuum switching tubes generally consist of a cylindrical, evacuated, insulating ceramic housing in which to switching contacts are located. One of the two switching contacts is fixed whereas the other switching contact is arranged so as to be movable. The ends of the ceramic housing are metallized at the end faces and soldered to metallic flanges. In order to transfer the movement of the movable contact from outside to inside the vacuum chamber, the contact is connected to the housing by means of a metal bellows. In order for evaporating contact material not to deposit on the inner surface of the ceramic during a switching process and for the insulation to weaken, a metal vapor shield made of copper or stainless steel is applied in the region of the contacts. Depending on the embodiment variant, the metal vapor shield may have no potential or may be connected to one of the contacts. The metal bellows may also be provided with a lid for the purpose of protection. In order to prevent dielectric problems at the transition and the ceramic to the metallic end flange, corresponding shieldings may be integrated. The two contact pieces form parts of the switching contact arrangement and may or may not make contact depending on the distance between the two contact pieces. The current collectors which pass on the currents conducted by the contact pieces may also be part of the switching contact arrangement.

In method step a), two electrical contact pieces made of copper or a copper alloy are provided. In this case, the electrical contact pieces consist entirely of copper or may also comprise copper alloys. For example, alloys of copper and chromium with a chromium content of for example 25-50% have also proven suitable. According to the invention, it is possible in principle for only one contact piece to be provided with the aluminum alloy according to the invention. However, it has proven to be significantly more efficient for both contact pieces of the vacuum switching tube to be provided with an aluminum coating in accordance with the invention. In this case, the contact pieces may have any geometry. However, cylindrical geometries which each have two end sides and a lateral surface have been found to be particularly favorable. One end side is responsible for the mechanical and electrical contact-connection of the other contact piece during operation of the vacuum switching tube, whereas the other end side of the contact piece is then provided with an aluminum coating in accordance with the invention and is welded to the current collectors.

In method step b), in each case at least one side of the electrical contact pieces are coated with aluminum or an aluminum alloy, the coating of the contact pieces taking place by means of a cold gas spraying method and at least one coated side being located opposite the contact side of the two contact pieces. Cold gas spraying is a coating method for metals in which a pulverulent metal material, metal alloys, are applied to a substrate at high speeds. The powder binds to the substrate due to the high kinetic energy of the powder. The gas may preferably be nitrogen and this is accelerated to supersonic speed through high pressure and by means of a nozzle. Heating the gas beam can increase the flow rate of the gas and thus also increase the particle speed. The thus likewise associated heating of the particles can cause them to deform upon impact. However, the gas temperature in cold gas spraying is significantly below the melting temperature of the powder used, with the result that the metal particles in the gas beam are not melted. Surprisingly, this technique can also be used in the design of vacuum switching tubes and this technique can be used to produce layers which can withstand the extreme loads caused by the currents and voltages arising. In addition, it was not possible to predict that the coatings which can be produced by this coating technique are also suitable for use in vacuum. The combination of electrical load and environmental conditions appears a priori to be unsuitable for the use of this technique. In this respect, at least the rear side of the switching contact or contacts is coated by means of cold gas spraying, with the rear side meaning the side which does not make direct contact with the other switching contacts. The rear side of the switching contacts is connected to the current transfer contact which electrically connects the switching contact to the other components of the electrical network.

For the coating, powders made of aluminum or aluminum alloys may be suitable, for example, these having a narrow particle size distribution. For example, aluminum powder with a monodisperse size distribution by a D50 value between 10 and 250 μm has been found to be particularly suitable (measured by means of dynamic light scattering). These powders may form layers which are particularly resistant to mechanical load and these layers also have only a small proportion of air pockets. This may contribute to retaining the best possible vacuum inside the vacuum tubes.

In method step c), each of the sides of the contact pieces coated with aluminum in method step b) is welded to a current transfer contact. The mechanical and electrical connection of the individual contact pieces to the respective current transfer contact is thus carried out not by means of a copper layer but by means of the aluminum layer applied in accordance with the invention using a cold gas spraying method. Direct welding of a copper layer or a copper alloy layer to the current transfer contact, which may also conventionally be made of copper, is technically not possible. The aluminum layer may in this case be welded to the current transfer contact by the welding methods known from the prior art.

In method step d), the units consisting of contact piece and current transfer contact obtained in method step b) are arranged inside the vacuum circuit breaker. After the contact piece and current transfer contact have been joined together by a welding method, the units consisting of the contact piece and current transfer contact are introduced into the vacuum chamber of the vacuum circuit breaker. To this end, other component parts of the vacuum circuit breaker, such as for example a metal bellows or the end seals, can be connected to the units in any manner. The welded connection may be located inside or else outside of the vacuum chamber after installation. This results as a function of the geometry of the contact piece and the current transfer contact.

In one preferred embodiment of the method, in method step b), in addition to the side which is located opposite the contact side, regions of the two contact pieces adjacent thereto are also coated with aluminum or an aluminum alloy by means of a cold gas spraying method. According to the method, the contact pieces are provided with an aluminum coating at the desired connection point to the current collector. In addition to the coating of this connection point, it has been found to be particularly suitable for additional surfaces of the contact piece to also be provided with an aluminum coating. An adjoining region that is suitable for this is for example the lateral area of the contact piece. If the contact piece is for example of cylindrical shape, the coating is applied once to an end side and at least again to a part of the adjoining lateral cylinder surface. This coating can contribute to improved electrical properties of the contact piece. Furthermore, this configuration can make a more uniform coating of the end side of the contact piece possible.

In another preferred configuration of the method, the side which is located opposite the contact side can be coated in method step b) with a constant layer thickness. To obtain the most uniform possible mechanical and electrical properties of the connection point between the current collector and contact piece, a coating of the contact piece with a constant layer thickness has been found to be particularly suitable. A constant layer thickness can be adopted in cases in which the layer thickness over the surface under consideration, for example the end side, varies by less than 10%. Generally suitable layer thickness ranges for the reliable connection between the current collector and contact piece may be between 500 μm and for example 3 cm.

Within the context of one preferred aspect of the method, the cold-gas-sprayed aluminum coating is mechanically processed after application. To obtain the most reproducible strength possible within the context of the welding process, it has been found to be particularly suitable for the applied aluminum coating to be subjected to another mechanical processing step. This mechanical processing step may involve for example smoothing the layer by way of a grinding process. However, it is also possible for the aluminum layer to be somewhat reduced in thickness by an ablation process. To this end, lathing or lapping of this layer may be suitable, for example. However, the aluminum coating may also obtain a particularly suitable slight surface roughness for example by way of a smoothing process, which leads to improved mechanical bonding within the context of the welding process.

Within another preferred configuration of the method, the welding method in method step c) may be an electron beam welding method. The connection of the applied aluminum layer to the other current transfer contact or current collector by means of an electron beam welding method has been found to be particularly suitable with respect to the mechanical and electrical properties of the connection. The electron beam welding method may lead in particular to the connection between both parts being particularly homogenous, which may also contribute to particularly homogenous dissipation of the currents within the vacuum switching chamber. Furthermore, the mechanical forces that arise can particularly advantageously be absorbed by means of the homogenous connection.

Within a preferred characteristic of the method, the weldable surface of the current transfer contact has partially silver-plated contact surfaces. To improve the current conduction via the unit consisting of the current collector or current transfer contact and contact piece, it has proven to be advantageous for the current transfer contact to have regions which are silver-plated on the contact surface for the aluminum coating of the contact piece. The silver-plated surfaces on the current transfer contact may preferably make up an extent of 5% to 25% of the total surface area of the current transfer contact.

Furthermore, the invention provides an electrical switching contact arrangement for a vacuum circuit breaker, wherein the electrical switching contact arrangement comprises two opposite contact pieces each composed of at least one two-layered metallic composite material with a layer of copper and a layer of aluminum or alloys thereof, wherein the surfaces of the contact pieces each oriented facing one another comprise the copper layers and the surfaces of the contact pieces each facing away therefrom comprise the aluminum layers, wherein one or both switching contact pieces of the electrical switching contact arrangement are obtained according to a method according to the invention and the contact pieces are each welded to a current transfer contact of the vacuum circuit breaker. The electrical switching contact arrangement for a vacuum circuit breaker accordingly has two contact pieces, wherein the contact pieces each individually have a layer which has been applied by means of a cold gas spraying method. This further layer of aluminum bonds very well to copper and is welded to the further current collector by means of a welding method. By way of this configuration, the measures usually carried out to connect the contact piece and current collector, such as for example screwing or clamping, are omitted. A homogenous bond between the contact piece and the current collector is obtained, which also leads in particular to the electric currents that arise during switching being dissipated homogeneously and uniformly by way of the contact piece and the current collector. For the other advantages of the switching contact arrangement according to the invention, reference is explicitly also made to the advantages of the method according to the invention.

In one preferred configuration of the electrical switching contact arrangement, the layer thickness of the aluminum coating on the side which is located opposite the contact side and/or on the lateral surface may be greater than or equal to 1 mm and less than or equal to 20 mm. These layer thicknesses of the aluminum coating have been proven for a mechanically durable and electrically advantageous connection of the contact piece to the current collector. The result is a low-maintenance vacuum circuit breaker whose electrical performance is reduced only insignificantly by the introduced aluminum layer. Smaller layer thicknesses may be disadvantageous because in this case there is no sufficient layer thickness for welding. Greater layer thicknesses may be disadvantageous because in this case the electrical properties of the units consisting of the contact piece and the current collector are significantly reduced.

Within one preferred embodiment of the electrical switching contact arrangement, the layer thickness of the aluminum coating on the side which is located opposite the contact side may be greater than or equal to 2.5 mm and less than or equal to 20 mm and the coating on the lateral surface is greater than or equal to 1 mm and less than or equal to 7.5 mm. To obtain the most uniform possible coating, it has been found to be advantageous for both the end side and the lateral surface of the contact piece to be coated. In this case, it is advantageous in particular for the layer thickness on the lateral layer of the contact piece not to achieve the same thickness as the coating on the end surface. This difference in the thicknesses may contribute to a particularly advantageous diversion of currents arising in the region of the unit consisting of the contact piece and current collector or current transfer contact.

According to another preferred aspect of the electrical switching contact arrangement, the thickness ratio between the copper and aluminum layer of the contact piece, expressed as the quotient of the thickness (copper)/thickness (aluminum), may be greater than or equal to 4 and less than or equal to 15. To obtain the most high-performance switch possible, it has been found to be advantageous to retain the aforementioned ranges of the relation between the thickness of the contact piece and the thickness of the applied aluminum layer. Through this relation, the electrical performance is significantly not reduced and improved mechanical properties of the unit consisting of the contact piece and current collector are maintained.

With respect to further advantages and technical features of the switch arrangement, reference is made to the description of the switch arrangement, the figures and the description of the figures, and vice versa.

Further details, features and advantages of the subject matter of the invention result from the dependent claims and from the following description of the figures and the associated examples. In the figures:

DETAILED DESCRIPTION OF THE INVENTION

Figure 1:
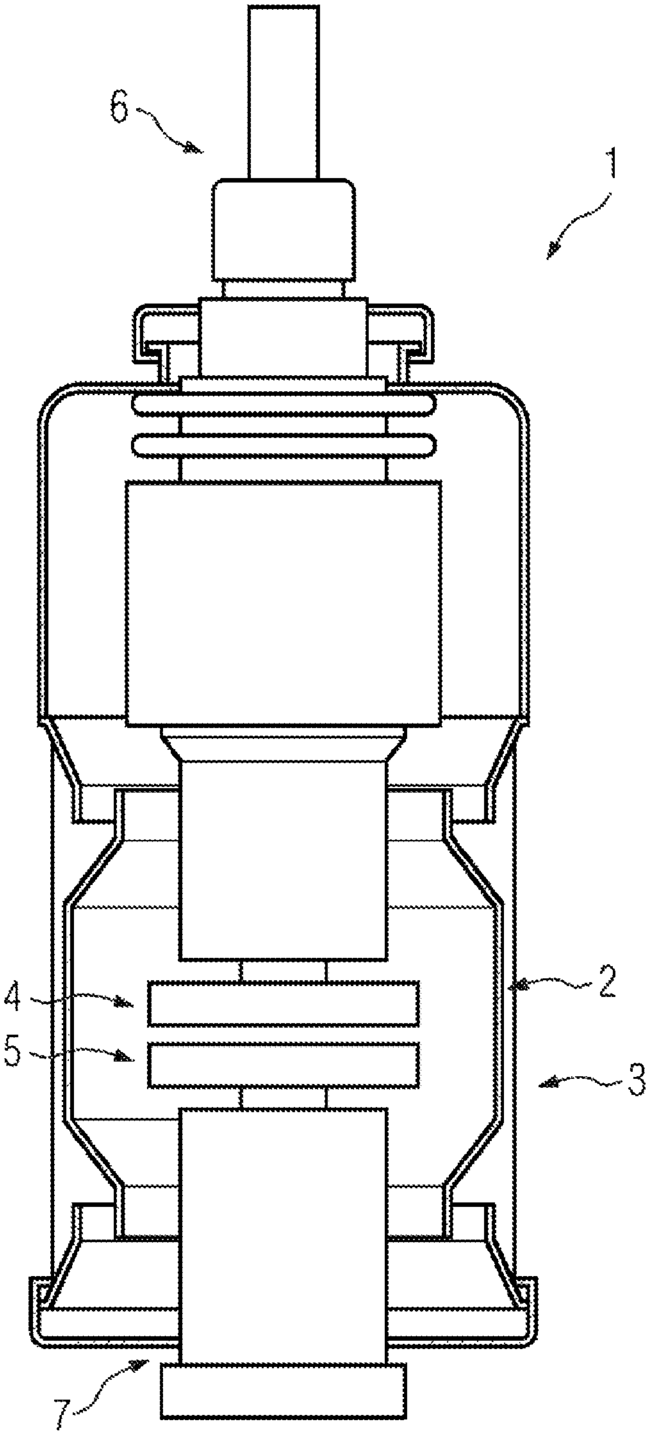
FIG. 1 shows a schematic overview of the modules of a vacuum circuit breaker from the prior art in a top view.

FIG. 1 schematically shows the design of a vacuum circuit breaker 1. The vacuum circuit breaker 1 has two contact pieces 4, 5, of which one of the contact pieces is arranged so as to be movable and one of the contact pieces is arranged so as to be stationary. In addition to further modules, the vacuum circuit breaker 1 also has a metal vapor shield 2 and an external insulator 3. The contact piece 4 is connected to the rest of the electrical network means of the current collector 6. The contact piece 5 is connected to the rest of the electrical network by way of the current collector 7. The contact pieces 4, 5 may be connected to each of the corresponding current collectors 6, 7 for example by means of a clamp connection or a screw connection.

Figure 2:
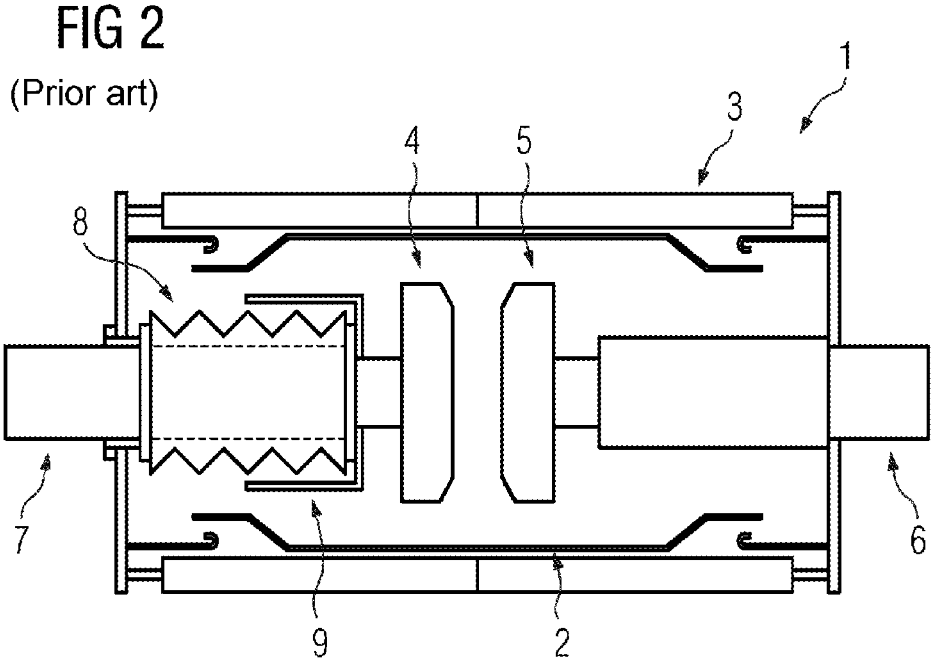
FIG 2 (Prior art)
FIG. 2 shows a schematic overview of modules of a vacuum circuit breaker from the prior art in cross section.

FIG. 2 also schematically shows the design of a vacuum circuit breaker 1. The vacuum circuit breaker 1 has two contact pieces 4, 5, of which in this example the contact piece 4 is arranged so as to be movable and the contact piece 5 is arranged so as to be stationary. In addition to other modules, the vacuum circuit breaker 1 may also have a metal vapor shield 2, a metal bellows 8, a protective lid 9 for the metal bellows 8, and an external insulator 3. The contact piece 4 is connected to the rest of the electrical network by means of the current collector 7. The contact piece 5 is connected to the rest of the electrical network by way of the current collector 6. The contact pieces 4, 5 may be connected to each of the corresponding current collectors 6, 7 for example by means of a clamp connection or a screw connection.

Figure 3:
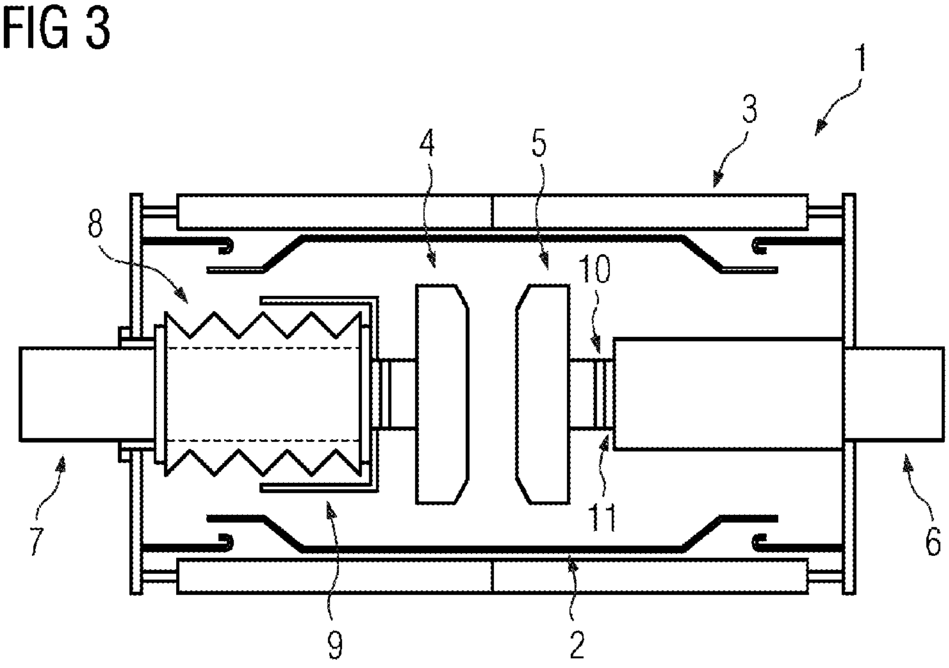
FIG. 3 shows a schematic overview of the modules of a vacuum circuit breaker according to the invention in cross section.

FIG. 3 schematically shows the design of a vacuum circuit breaker 1 according to the invention. The vacuum circuit breaker 1 comprises two contact pieces 4, 5, of which in this example the contact piece 4 is arranged so as to be movable and the contact piece 5 is arranged so as to be stationary. In addition to other modules, the vacuum circuit breaker 1 may also have a metal vapor shield 2, a metal bellows 8, a protective lid 9 for the metal bellows 8, and an external insulator 3. The contact piece 4 is connected to the rest of the electrical network by means of the current collector 7. The contact piece 5 is connected to the rest of the electrical network by way of the current collector 6. The contact pieces 4, 5 each have a cold-gas-sprayed aluminum layer 10 on the end sides or surfaces thereof. The respective contact piece 4, 5 is mechanically connected to the corresponding current collector or current transfer contact 6, 7 via a welded connection 11 by means of said cold-gas-sprayed aluminum layer 10. The result is a mechanically extremely stable unit which is subjected to significantly fewer mechanical faults. In addition, the dimensions of the contact pieces 4, 5 in relation to the thickness of the aluminum coating 10 result in very good electrical properties for the unit consisting of the contact piece 4, 5 and current collector 6, 7. In this configuration, the welded connection points 11 are located inside the vacuum chamber. It is also possible to arrange one of the welded points 11 inside and one of the welded points 11 outside the vacuum chamber.

Figure 4:
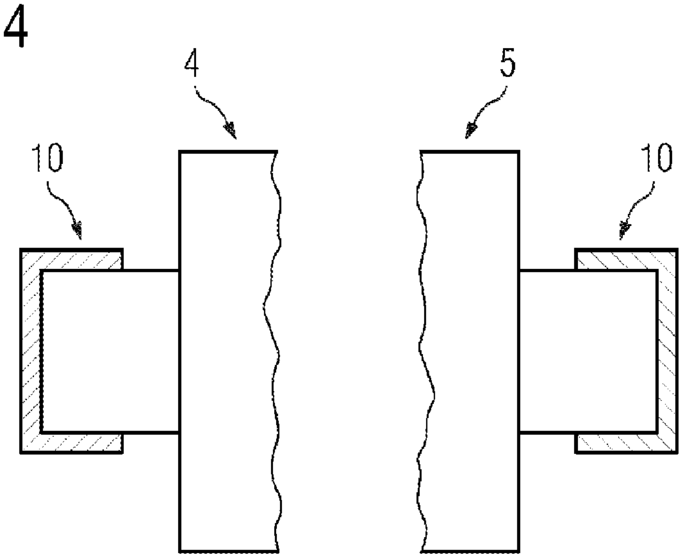
FIG. 4 shows a schematic overview of two contact pieces each having an aluminum coating on the end side and partially on the lateral surface.

FIG. 4 schematically shows contact pieces 4, 5 according to the invention each having a cold-gas-sprayed aluminum layer 10. The coating is carried out uniformly, with it being possible to identify here that both the end side and the lateral layer of the contacts have been coated. This coating may contribute to particularly advantageous electrical and mechanical properties of the vacuum circuit breaker 1.

Figure 5:
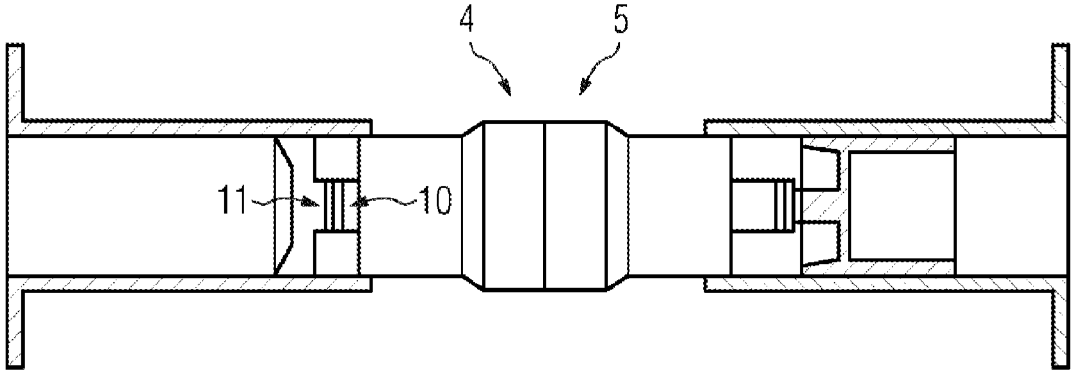
FIG. 5 shows a schematic overview of a contact arrangement composed of two units according to the invention consisting of a contact piece and current collector in cross section.

FIG. 5 schematically shows a configuration according to the invention for the connection of the contact pieces 4, 5 and the current collectors 6, 7. In this figure, each of the cold-gas-sprayed aluminum layers 10 and the welded connections 11 to the current collectors are illustrated. In this configuration, the welded connection points 11 are located outside the vacuum chamber.

REFERENCE SIGNS

- 1 Vacuum circuit breaker
- 2 Metal vapor layer
- 3 Insulator
- 4 Movable contact piece
- 5 Stationary contact piece
- 6 Current collector

7 Current collector
8 Metal bellows
9 Protective lid
10 Cold-gas-sprayed aluminum layer
11 Welded connection

The invention claimed is:

1. A method of producing an electrical switching contact arrangement for a vacuum circuit breaker having two electrical contact pieces, the method which comprises the following steps:

a) providing two electrical contact pieces made of copper or a copper alloy, each of the contact pieces having a contact side;

b) coating, by way of a cold gas spraying process, at least one side of each of the electrical contact pieces with aluminum or an aluminum alloy, and thereby coating at least a side of each of the contact pieces located opposite the contact side of a respective contact piece;

c) welding sides of the contact pieces that are coated with aluminum or aluminum alloy in method step b) to a current transfer contact to form units each consisting of the contact piece and the current transfer contact; and d) arranging the units consisting of the contact piece and the current transfer contact inside the vacuum circuit breaker.

2. The method according to claim 1, wherein method step b) comprises, in addition to the side which is located opposite the contact side, coating regions of the two contact pieces adjacent the side opposite the contact side with aluminum or an aluminum alloy by way of the cold gas spraying process.

3. The method according to claim 2, which comprises coating the side which is located opposite the contact side in method step b) with a constant layer thickness.

4. The method according to claim 1, which comprises mechanically processing the cold-gas-sprayed aluminum coating after application.

5. The method according to claim 1, which comprises performing the welding step c) by an electron beam welding method.

6. The method according to claim 1, which comprises providing a weldable surface of the current transfer contact with partially silver-plated contact surfaces.

7. An electrical switching contact arrangement for a vacuum circuit breaker, the switching contact arrangement comprising:

two mutually opposite switching contact pieces each composed of at least one two-layered metallic composite material with a layer of copper or an alloy thereof and a layer of aluminum or an alloy thereof;

wherein respective surfaces of said contact pieces facing toward one another are formed of copper layers and respective surfaces of the contact pieces facing away from one another are formed of aluminum layers; and wherein one or both of said switching contact pieces are formed by the method according to claim 1; and each of said switching contact pieces being welded to the current transfer contact of the vacuum circuit breaker.

8. The electrical switching contact arrangement according to claim 7, wherein a layer thickness of the aluminum coating on the side opposite the contact side and/or on a lateral surface is greater than or equal to 1 mm and less than or equal to 20 mm.

9. The electrical switching contact arrangement according to claim 7, wherein a layer thickness of the aluminum coating on the side opposite the contact side is greater than or equal to 2.5 mm and less than or equal to 20 mm and the coating on a lateral surface is greater than or equal to 1 mm and less than or equal to 7.5 mm.

10. The electrical switching contact arrangement according to claim 7, wherein a thickness ratio between the copper and aluminum layer of the contact piece, expressed as a quotient of a thickness of copper over a thickness of aluminum, is greater than or equal to 4 and less than or equal to 15.

* * * * *